United States Patent [19]
Hendrikse

[11] Patent Number: 5,628,420
[45] Date of Patent: May 13, 1997

[54] ROLLABLE CONTAINER

[76] Inventor: Pieter J. Hendrikse, 93 Johnson Street, Moregloed, Pietersburg, 0699, Transvaal, South Africa

[21] Appl. No.: 656,695

[22] Filed: Jun. 3, 1996

Related U.S. Application Data

[63] Continuation of Ser. No. 96,163, Jul. 22, 1993, abandoned.

[30] Foreign Application Priority Data

Jul. 22, 1992 [ZA] South Africa ............................ 92/5506

[51] Int. Cl.$^6$ ...................................................... B65D 6/02
[52] U.S. Cl. .......................... 220/4.04; 220/4.05; 220/661; 220/669; 220/DIG. 13
[58] Field of Search ................................. 220/4.04, 4.05, 220/4.13, 4.26, 661, 669, DIG. 13

[56] References Cited

U.S. PATENT DOCUMENTS

| | | | |
|---|---|---|---|
| 2,868,370 | 1/1959 | Franks | 206/303 |
| 2,959,820 | 11/1960 | Miller et al. | 18/58.3 |
| 3,819,847 | 6/1974 | Charles | 206/303 |
| 3,887,069 | 6/1975 | Diwo | 206/229 |
| 4,475,662 | 10/1984 | Mandel | 220/566 |
| 4,790,472 | 12/1988 | Bunkoczy | 220/566 |

FOREIGN PATENT DOCUMENTS

| | | |
|---|---|---|
| 1416854 | 9/1965 | France . |
| 2039898 | 8/1970 | Germany . |
| 444957 | 5/1990 | Japan ................................. 206/303 |
| 878971 | 10/1961 | United Kingdom . |
| 1476638 | 6/1977 | United Kingdom . |

OTHER PUBLICATIONS

*Rolli–Tankers*, The Military Engineer, vol. 48, No. 22, 3 Apr. 1956, p. 145.
*Hoe men ook vloeistoffen kan vervoeren*, Bedrijf en Techniek, vol. 12, No. 272, 2 Sep. 1957, p. 80.

*Primary Examiner*—Joseph M. Moy
*Attorney, Agent, or Firm*—Webb Ziesenheim Bruening Logsdon Orkin & Hanson, P.C.

[57] ABSTRACT

The invention relates to a container comprising a hollow enclosed substantially cylindrical rigid body. The body is provided with an elongate passageway extending through the body along the cylindrical axis thereof, the body further provided with a sunken filler opening suitable for receiving a closure means in the form of a threaded cap. The container is provided with a handling device for retaining the container rotatably about the cylindrical axis. A method for manufacturing the container by use of rotational moulding is also provided.

6 Claims, 2 Drawing Sheets

ROLLABLE CONTAINER

This is a continuation of application Ser. No. 08/096,163 filed on Jul. 22, 1993, now abandoned.

BACKGROUND OF THE INVENTION

1. Field of the Invention

This invention relates to a container. More particularly but not exclusively, the invention relates to a container such as a barrel, a can or a drum having a passageway therethrough and a process for manufacturing the container.

2. Prior Art

Many different containers presently exist, and containers such as barrels, cans, drums and the like are well known and widely used in many industries. However, beyond a portable size the manual conveyance of these types of containers creates difficulty since the shape to weight ratio of the containers when filled hampers their maneuverability and special equipment is therefore often required to maneuver them. When rollable, containers such as barrels, drums and cylindrical cans are often conveyed or maneuvered manually by way of rolling the containers. However, a rolling, filled container creates further difficulty in controlling the direction and the pace of the moving container. Thus, many different designs have aimed at improving the maneuverability of these containers, with features such as gripping or holding formations integral with or attachable to the containers.

One such known design comprises a container having a cylindrical body with two opposing substantially flat end surfaces, the end surfaces having shallow blind socket formations projecting inwardly therefrom substantially along the cylindrical axis of the body.

This known container is used in conjunction with a rigid V-shaped handling means having a retainer mechanism in the form of plug formations protruding inwardly from the ends of the two opposing limbs of the V-shaped handling means. The container and handling means combination is used by locating and retaining rotatably the container about its cylindrical axis between the opposing limbs by means of the co-operating plug and socket formations, enabling the container to be maneuvered with the handling means.

A known modification to this design comprises stub elements protruding along the cylindrical axis outwardly from the opposing end surfaces to receive and secure a handling means for retaining and maneuvering the container rotatably about the cylindrical axis. A second known modification to the above design comprises a similar container mounted permanently on an axle extending through the container along the cylindrical axis thereof, the axle pivotably mounted on a handling means.

However, a limitation of the above known container and modified or related designs is the constant need for a suitable handling means without which the container is reduced to a conventional substantially cylindrical container. This known container is further limited in that the need for standing or stacking the container in an upright position and/or handling the container otherwise than by rolling requires the handling means to be detachable from the container or be capable of retaining and/or suspending the container when loaded from the retainer mechanism. The modified and/or related designs are similarly limited, with the designs having integral protruding elements totally incapable of extending and/or stacking.

Also, a further limitation is the top load compression resistance of these containers that is the ability of the containers to withstand large loads such as when filled containers are being stacked on top of each other. Thus, vertical support structures are often essential to provide added strength and increase the top load compression resistance of stacked containers.

It is accordingly an object of the invention to provide a container aimed at overcoming the above limitations or at least to provide a useful and novel alternative to existing containers of the abovementioned type.

SUMMARY OF THE INVENTION

According to a first aspect of the invention a container comprises a hollow enclosed substantially rigid body having an elongate passageway extending substantially vertically through the body with the body in the upright position to define an annular-like enclosure substantially around and evenly about the passageway, the passageway providing the container with a holding formation as well as a vertical support structure, the body being provided with a filler opening suitable for receiving a closure means.

The hollow enclosed body may be cylindrical with a cylindrical axis, the passageway extending substantially along the cylindrical axis to define a substantially cylindrical inner wall for the annular-like enclosure, the enclosure having a substantially cylindrical outer wall consisting of a hollow cylindrical middle section integral with two hollow frusto conical end sections, the two end sections diametrically converging away from the middle section to define a substantially barrel-shaped annular-like enclosure. The annular-like enclosure preferably extends endlessly around the passageway.

The passageway may be tubular with a circular cross-section, the passageway converging diametrically from opposing ends inwardly to provide a minimum circular cross-section substantially midway between the two opposing ends with the passageway preferably integral with the body.

The container may be provided with a handling means extending at least partially into the passageway for retaining and maneuvering the container by means of the passageway. The handling means preferably retains the container rotatably about the cylindrical axis rendering the container rollable while being retained by the holding means.

The holding means may comprise an elongate flexible member capable of extending loosely through the passageway as well as creating a closed loop from which the container is rotatably retainable.

According to a second aspect of the present invention a method for manufacturing by means of a rotational moulding process a container as herein defined or described includes the steps of;

providing moulding apparatus having a two-part mould rotational about a plurality of axes, the mould defining a mould cavity substantially similar to the shape and configuration of the container, the mould having an elongate member spanning in use the mould cavity substantially along a centre line of the mould cavity to provide a mould formation for the passageway, the elongate member being of suitable dimensions relative to the dimensions of the mould cavity to provide an adequate mould formation without the use of a fusion surface of plastics material on the elongate member;

introducing a sufficient amount of thermosetting plastics moulding material to the mould;

rotating the mould about the plurality of axes;

providing sufficient heat to enable the thermosetting plastics moulding material to liquify; and discontinuing the provision of heat to allow the thermoserring plastics material to mould and set evenly along the surfaces of the mould; and discontinuing the rotation of the mould allowing the moulded hollow body to be removed.

The method for manufacturing the container preferably includes the step of;

providing moulding apparatus of which the ratio of the outer diameter of the elongate member at the opposing ends thereof to the inner width of the mould cavity at the corresponding opposing ends thereof is in the order of 1:3.

BRIEF DESCRIPTION OF THE DRAWINGS

A preferred embodiment of the invention will now be described by way of example only and with reference to the accompanying drawings wherein.

DESCRIPTION OF THE PREFERRED EMBODIMENTS

Figure 1:
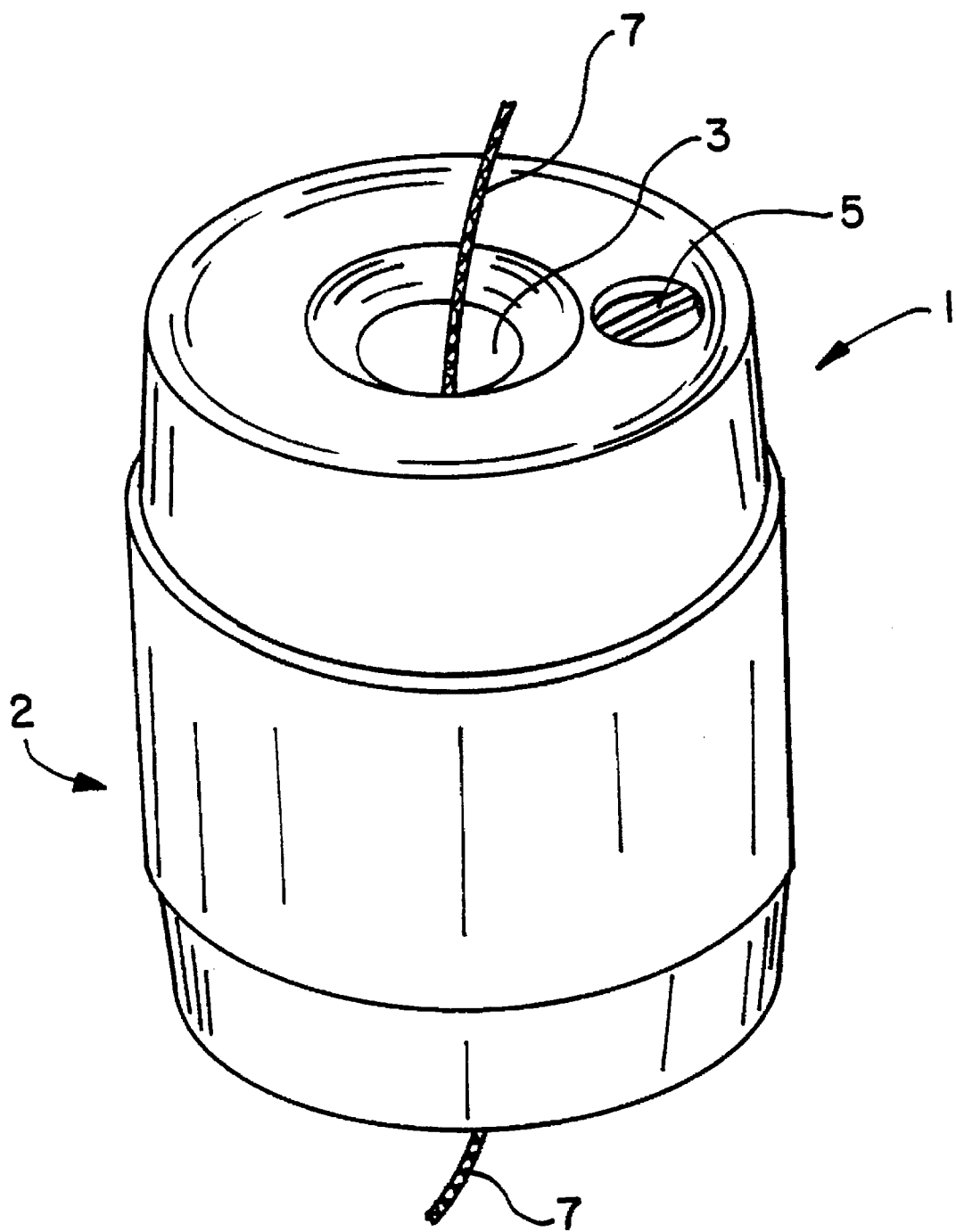
FIG. 1 is a perspective view of a substantially cylindrical container in accordance with the present invention.

The same reference numerals are used to denote corresponding parts in the accompanying drawings.

Figure 2:
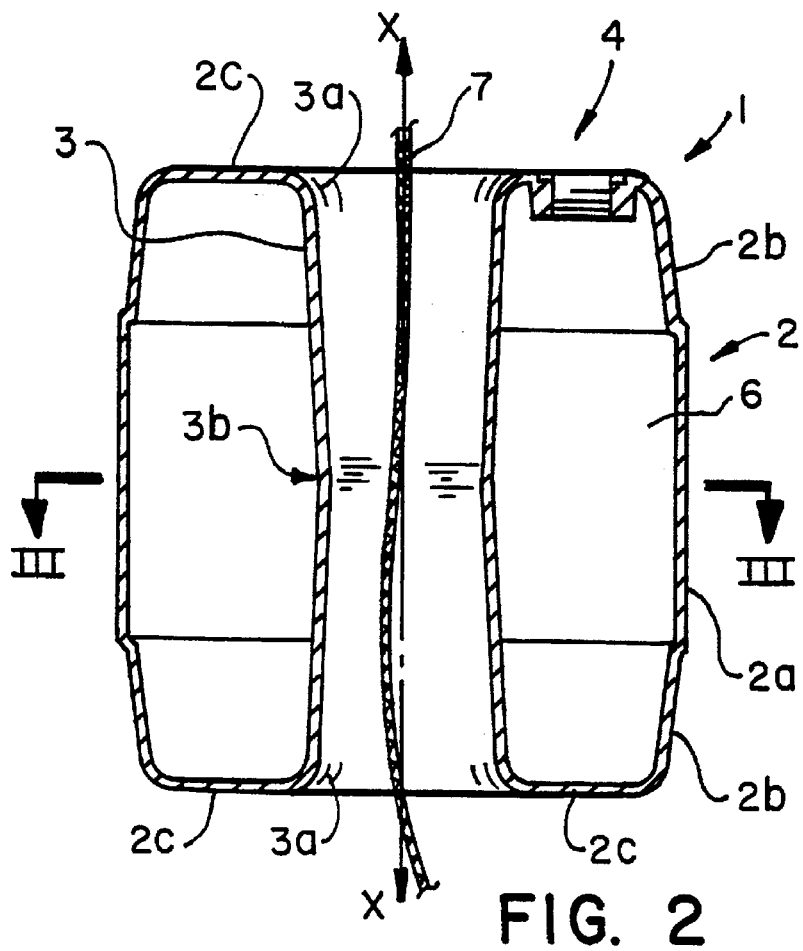
FIG. 2 is a cross-sectional side view of the container illustrated in FIG. 1.
Figure 3:
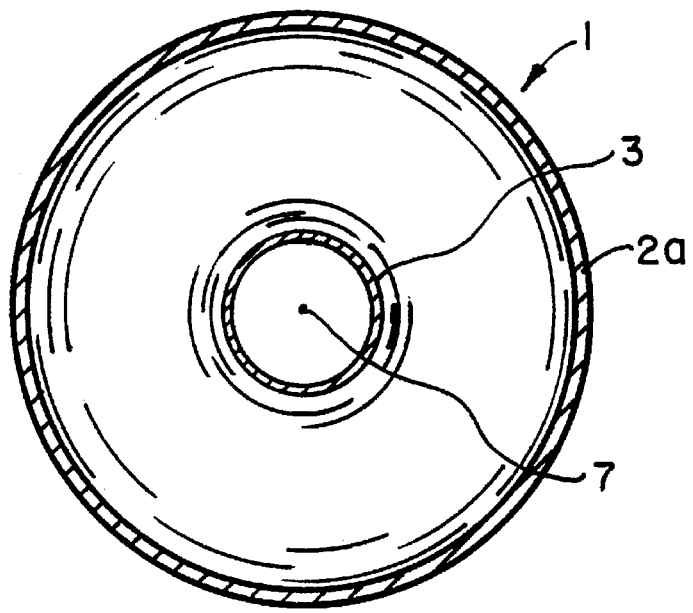
FIG. 3 is a cross-sectional plan view along line III—III of the container illustrated in FIGS. 1 and 2.

A container 1 as illustrated in FIGS. 1, 2 and 3 comprises a hollow enclosed substantially cylindrical rigid body 2 provided with an elongate passageway 3 extending through the body along the cylindrical axis thereof, the body further provided with a sunken filler opening 4 for receiving a filler material and suitable for receiving a closure means 5 in the form of a threaded cap.

The hollow enclosed substantially cylindrical rigid body 2 consists of a hollow cylindrical middle section 2a having a flat cross-section integral with two hollow thrusto conical end sections 2b. Sections 2a and 2b define an outer wall. The two frusto conical end sections 2b converge away from the cylindrical middle section 2a to define a substantially barrel-shaped container 2.

The passageway 3 is integral with the body 2 to define an annular-like enclosure 6 extending endlessly around the passageway 3. The passageway 3 is tubular with a circular cross-section and is flared at its two opposing ends 3a to integrate radially outwardly with the corresponding opposing end surfaces 2c of the cylindrical body 2 to define the annular-like enclosure 6. End surfaces 2c are flat and transverse to the cylindrical axis X. The passageway 3 extends along the longitudinally extending cylindrical axis X. The passageway 3 converges diametrically from the two opposing ends 3a inwardly to provide the passageway defined by a tubular inner wall with a minimum circular cross-section 3b midway between the two opposing ends.

The container 1 is provided with a handling means 7 for retaining the container rotatably about the cylindrical axis by means of the passageway 3. The retaining means 7 consists of an elongate flexible member in the form of a rope.

In use the handling means 7 is passed through the passageway 3 to retain the container 1 rotatably about the cylindrical axis rendering the retained container 1 maneuverable by rolling or suspending the container 1 by means of the handling means.

The manufacture of small hollow articles (not shown) by means of rotational moulding is well-known. Also, the moulding of large hollow articles is known to require a fusion surface of plastics material on a mould member spanning a required mould cavity of a moulding apparatus (not shown), the member providing a mould formation for the passageway.

However, the manufacture of the substantially barrel-shaped annular-like enclosure 6 is alternatively and preferably carried out without the fusion surface. Conventional rotational moulding apparatus (not shown) as used for moulding drum-like containers from thermosetting plastics material is used with a two-part mould defining a mould cavity identical to the shape and configuration of the container 1, the mould having an integral elongate member spanning in use the mould cavity along the cylindrical axis of the mould cavity to provide a mould formation for the passageway 3. The mould and the elongate member is split into two parts along line III—III as illustrated in FIG. 3, providing for the removal of the moulded hollow substantially barrel-shaped body 2. The elongate member has an outer shape and configuration identical to the inner shape and configuration of the passageway 3. It was found that, for a container such as container 1 with a total height of 540 mm and an outer diameter of 520 mm, an elongate member, with an outer shape and configuration such as the inner shape and configuration of the passageway 3, does not require a fusion surface of the plastics material to allow the thermosetting plastics material to distribute and set evenly along the inner surface of the mould and the outer surface of the elongate member. The passageway 3 has a shape and configuration as hereinbefore described, with a length of 540 mm, an inner diameter of 175 mm at the two opposing ends 3a of the passageway and an inner diameter of 135 mm midway 3b between the two opposing ends.

It will be appreciated that many variations in detail are possible without departing from the scope and/or spirit of the invention.

I claim:

1. A rollable container for storing and transporting a filler material, comprising: a hollow enclosed substantially rigid body, the body being substantially cylindrical with a cylindrical axis, having an elongate passageway extending substantially vertically through the body with the body in the upright position to define an annular-like enclosure substantially around and evenly about the passageway, the enclosure adapted to contain a filler material, the passageway extending substantially along the cylindrical axis to define a tubular inner wall for the annular-like enclosure, the enclosure having an outer wall comprising a hollow cylindrical middle section having a flat cross-section integral with two hollow frustoconical end sections, each end section having flat ends transverse to said cylindrical axis, the two end sections diametrically converging away from the middle section to define a substantially barrel-shaped, annular-like enclosure providing the container with a holding formation as well as a vertical support structure, the holding formation adapted for retaining the filler material and the cylindrical middle section permits rolling and maneuvering the rollable container about the cylindrical axis using an elongated member and the flat ends adapted to permit stackability of adjacent rollable containers thereon, the body being provided with a filler opening for receipt of a filler material and suitable for receiving a closure means.

2. A rollable container as claimed in claim 1 wherein the annular-like enclosure extends endlessly around the passageway.

3. A rollable container as claimed in claim 1 wherein the passageway is tubular with a circular cross-section, the passageway converging diametrically from opposing ends inwardly to provide a minimum circular cross-section substantially midway between the two opposing ends.

4. A rollable container as claimed in claim 3 wherein the passageway is integral with the body.

5. A rollable container as claimed in claim 1 wherein the container is provided with a handling means extending at least partially into the passageway for retaining and maneuvering the container, the handling means retaining the container rotatably about the cylindrical axis rendering the container rollable.

6. A rollable container as claimed in claim 5 wherein the handling means comprises an elongate flexible member capable of extending loosely through the passageway by which the container is rotatably retainable, maneuverable and rollable.

* * * * *